US008625887B2

(12) United States Patent
Li et al.

(10) Patent No.: US 8,625,887 B2
(45) Date of Patent: Jan. 7, 2014

(54) SYSTEMS AND METHODS FOR MATCHING VISUAL OBJECT COMPONENTS

(75) Inventors: Yuan Li, Los Angeles, CA (US); Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 249 days.

(21) Appl. No.: 13/182,076

(22) Filed: Jul. 13, 2011

(65) Prior Publication Data

US 2013/0016899 A1    Jan. 17, 2013

(51) Int. Cl.
*G06K 9/62*    (2006.01)

(52) U.S. Cl.
USPC .......................................... 382/159; 382/209

(58) Field of Classification Search
None
See application file for complete search history.

(56) References Cited

U.S. PATENT DOCUMENTS

| | | | |
|---|---|---|---|
| 7,239,929 | B2 | 7/2007 | Ulrich et al. |
| 7,725,484 | B2 | 5/2010 | Nister et al. |
| 2009/0125487 | A1 | 5/2009 | Rossi et al. |
| 2009/0220166 | A1 | 9/2009 | Choi et al. |
| 2009/0289942 | A1 | 11/2009 | Bailloeul et al. |
| 2010/0211602 | A1 | 8/2010 | Menon et al. |
| 2010/0329544 | A1 | 12/2010 | Sabe et al. |
| 2011/0103699 | A1 | 5/2011 | Ke et al. |
| 2011/0106798 | A1 | 5/2011 | Li et al. |

FOREIGN PATENT DOCUMENTS

KR    20100082683 A    7/2010

OTHER PUBLICATIONS

Bryan C. Russell, Antonio Torralba, Kevin P. Murphy, and William T. Freeman. "LabelMe: A Database and Web-Based Tool for Image Annotation". International Journal of Computer Vision. vol. 77, Issue 1-3, pp. 157-173. May 1, 2008.*
Widyantoro, D. H., Ioerger, T. R. and Yen, J. (2001), Learning user interest dynamics with a three-descriptor representation. J. Am. Soc. Inf. Sci., 52: 212-225.*
Hare, Jonathon S., and Paul H. Lewis. "On image retrieval using salient regions with vector-spaces and latent semantics." Image and Video Retrieval. Springer Berlin Heidelberg, 2005. 540-549.*
Jianjiang Lu, Tianzhong Zhao, Yafei Zhang, Feature selection based-on genetic algorithm for image annotation, Knowledge-Based Systems, vol. 21, Issue 8, Dec. 2008, pp. 887-891.*
Deng, Jia, et al. "Imagenet: A large-scale hierarchical image database." Computer Vision and Pattern Recognition, 2009. CVPR 2009. IEEE Conference on. IEEE, 2009.*

(Continued)

*Primary Examiner* — Stephen R Koziol
*Assistant Examiner* — Sean Conner
(74) *Attorney, Agent, or Firm* — Fish & Richardson P.C.

(57) ABSTRACT

Systems and methods for modeling the occurrence of common image components (e.g., sub-regions) in order to improve visual object recognition are disclosed. In one example, a query image may be matched to a training image of an object. A matched region within the training image to which the query image matches may be determined and a determination may be made whether the matched region is located within an annotated image component of the training image. When the matched region matches only to the image component, an annotation associated with the component may be identified. In another example, sub-regions within a plurality of training image corpora may be annotated as common image components including associated information (e.g., metadata). Matching sub-regions appearing in many training images of objects may be down-weighted in the matching process to reduce possible false matches to query images including common image components.

20 Claims, 9 Drawing Sheets

(56) References Cited

OTHER PUBLICATIONS

Carneiro, Gustavo, et al. "Supervised learning of semantic classes for image annotation and retrieval." Pattern Analysis and Machine Intelligence, IEEE Transactions on 29.3 (2007): 394-410.*

Srihari, Rohini K. "Automatic indexing and content-based retrieval of captioned images." Computer 28.9 (1995): 49-56.*

Zhu, Qiang, Mei-Chen Yeh, and Kwang-Ting Cheng. "Multimodal fusion using learned text concepts for image categorization." Proceedings of the 14th annual ACM international conference on Multimedia. ACM, 2006.*

Rabinovich, Andrew, et al. "Objects in context." Computer Vision, 2007. ICCV 2007. IEEE 11th International Conference on. IEEE, 2007.*

Chang, Shih-Fu, Wei-Ying Ma, and Arnold Smeulders. "Recent advances and challenges of semantic image/video search." Acoustics, Speech and Signal Processing, 2007. ICASSP 2007. IEEE International Conference on. vol. 4. IEEE, 2007.*

Liu, Ying, et al. "A survey of content-based image retrieval with high-level semantics." Pattern Recognition 40.1 (2007): 262-282.*

Lew, Michael S., et al. "Content-based multimedia information retrieval: State of the art and challenges." ACM Transactions on Multimedia Computing, Communications, and Applications (TOMCCAP) 2.1 (2006): 1-19.*

International Search Report for corresponding International Application No. PCT/US12/42095, Mar. 27, 2013.

Written Opinion for corresponding International Application No. PCT/US12/42095, Mar. 27, 2013.

* cited by examiner

Computer Program Product 900

Signal Bearing Medium 901

Program Instructions 902

- receiving a query image;
- matching the query image to an object using a visual object recognition module, wherein the visual object recognition module is configured to utilize information from a plurality of training image corpora to match the query image to a training image of the object;
- determining a matched region within the training image to which the query image matches using the visual object recognition module;
- determining whether the matched region is located within an annotated image component of the training image, wherein the annotated image component is a sub-region of the training image and has an associated annotation describing the sub-region; and
- when the matched region is located within the annotated image component of the training image, identifying an annotation associated with the annotated image component.

| Computer Readable Medium 903 | Computer Recordable Medium 904 | Communications Medium 905 |

FIGURE 9

SYSTEMS AND METHODS FOR MATCHING VISUAL OBJECT COMPONENTS

FIELD

This disclosure relates to object recognition, and in examples, to recognition of object components.

BACKGROUND

The ability to recognize objects can be used in many applications. While humans may easily identify a given object within an image or video, the same task may be more complex for computer vision systems. Numerous approaches and techniques have been developed to attempt to recognize objects using computer vision systems. One example includes training a recognition engine, or matcher, using a set of training, or reference, images.

A matcher may have knowledge of a set of training images used for recognizing objects. For example, training corpora may contain images of a set of objects, with one or more images of visual appearances of the object, as well as metadata identifying the objects. Given an image of an object to be recognized, the matcher may retrieve training images similar to the object and determine a match. Often times corresponding metadata of the matched training images may be returned, such as a type, name, title, etc. of the recognized object. Additionally, a matched region of the training image, to which the image of the object matches, may also be identified.

SUMMARY

This disclosure may disclose, inter alia, systems and methods for learning and matching visual object components.

In one example, a method for identifying an annotated image component matching a query image is provided. The method includes, but is not limited to, receiving a query image. The method further includes matching the query image to an object using a visual object recognition module. The visual object recognition module may be configured to utilize information from a plurality of training image corpora to match the query image to a training image of the object, for example. The method also includes determining a matched region within the training image to which the query image matches using the visual object recognition module. Additionally, the method includes determining whether the matched region is located within an annotated image component of the training image. In one example, the annotated image component may be a sub-region of the training image including an associated annotation describing the sub-region. The method further includes identifying an annotation associated with the annotated image component when the matched region is located within the annotated image component of the training image.

In another example, a non-transitory computer-readable medium with instructions stored thereon is provided. The instructions may be executable by a computing device. The instructions may be executable for receiving a query image and matching the query image to an object using a visual object recognition module. The visual object recognition module may be configured to utilize information from a plurality of training image corpora, for example, to match the query image to a training image of the object. The instructions may be further executable for determining a matched region within the training image to which the query image matches using the visual object recognition module. The instructions may also be executable for determining whether the matched region is located within an annotated image component of the training image. The annotated image component may be a sub-region of the training image, for example, and may include an associated annotation describing the sub-region. According to the executable instructions, an annotation associated with the annotated image component may be identified when the matched region is located within an annotated image component of the training image.

In another example, a system is provided. The system involves a memory and a processor coupled to the memory. The system further includes instructions, executable by the processor, stored in the memory. The instructions may be executable for receiving a query image and matching the query image to an object using a visual object recognition module. The visual object recognition module may be configured to utilize information from a plurality of training image corpora, for example, to match the query image to a training image of the object. The instructions may be further executable for determining a matched region within the training image to which the query image matches using the visual object recognition module. The instructions may also be executable for determining whether the matched region is located within an annotated image component of the training image. The annotated image component may be a sub-region of the training image, for example, and may include an associated annotation describing the sub-region. According to the executable instructions, an annotation associated with the annotated image component may be identified when the matched region is located within an annotated image component of the training image.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 9 is a schematic illustrating a conceptual partial view of an example computer program product that includes a computer program for executing a computer process on a computing device, arranged according to at least some embodiments presented herein.

DETAILED DESCRIPTION

Figure 1:
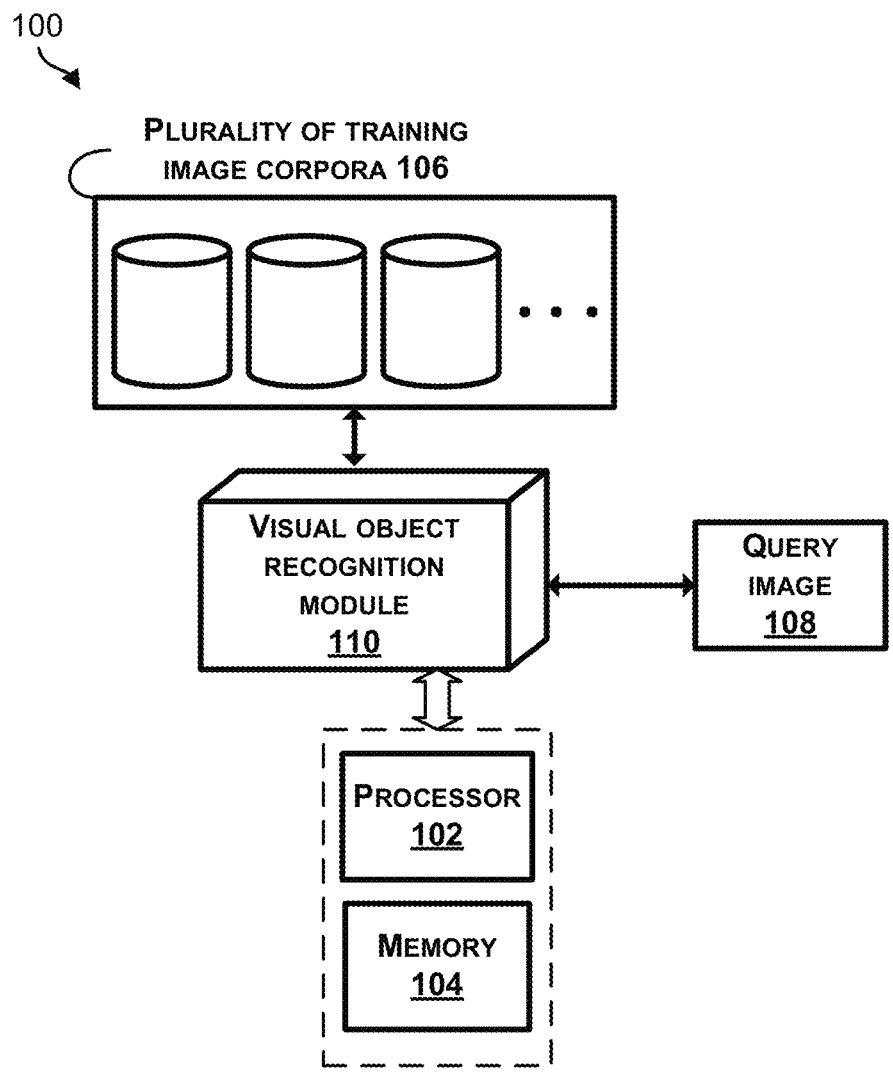
FIG. 1 illustrates an example system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, systems and methods for automatically learning and matching visual object components. The systems and methods may be directed to modeling the occurrence of common image components (e.g., sub-regions) in order to improve visual object recognition.

In one example, a query image may be received and matched to an object using a visual object recognition module. The visual object recognition module may be configured to utilize information from a plurality of training image corpora, for example, to match the query image to one or more training images of the object. A matched region within the training image to which the query image matches may also be determined by the visual object recognition module. Moreover, a determination may be made whether the matched region is located within an annotated image component of the training image. As an example, an annotated image component may be a sub-region of a training image including an annotation describing the sub-region.

In one example, when the matched region matches only to the image component (or a portion of an object of the image) rather than the whole object of the image, an annotation associated with the component may be identified and returned to a user. For example, when the matched region is located within the annotated image component of the training image, an annotation associated with the annotated image component may be identified. In addition, when a percentage of the matched region located within the annotated image component is less than a percentage threshold, an annotation associated with an entirety of the training image may be identified.

In another example, a plurality of training image corpora may be received. Cross-corpus image region matching may be performed among the plurality of training image corpora to discover common image components. Matched regions within the plurality of training image corpora may be annotated as sub-regions within the training images including associated information (e.g., metadata).

In yet another example, weighting factors influencing a matching process of the visual object recognition module may be adjusted. For example, common image components that frequently appear in many training images of objects may be down-weighted in the matching process to reduce possible false matches to query images including common image components.

Referring now to the figures, FIG. 1 illustrates an example system 100. One or more parts of the system 100 may be used to perform methods for learning and matching visual object components. The system 100 may include a processor 102 coupled to a memory 104. Additionally the system 100 may include a plurality of training image corpora 106, a query image 108, and a visual object recognition module 110, all of which may be coupled to the processor 102 and the memory 104.

The processor 102 may be any type of processor, such as a microprocessor, digital signal processor (DSP), multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis. In one example, the memory 104 may include non-transitory computer-readable media.

In one embodiment, the plurality of training image corpora 106 may include or describe a set of objects. For each object, there may be one or more training images containing visual appearances of the object, as well as metadata associated with the object (e.g., type, name, etc.).

In some examples, information within the plurality of training image corpora 106 may be processed for use by the visual object recognition module 110. For example, raw image data may be computed for comparing image similarity within a matching routine. Alternatively, matching may be performed based on image templates as an alternative to (or in addition to) matching raw image data. Matching image templates may be a more effective method than matching raw image data in terms of determining image similarity, for example.

In one example, for each image (e.g., training images of the plurality of training image corpora 106 and the query image 108), descriptors for image interest points may be extracted and an image template may be built. A descriptor may include information extracted from local pixels around an image interest point. An image interest point may be a point in the image that can have a clear definition (e.g., may be mathematically well-founded), can have a well-defined position in image space, can have a local image structure that is rich in terms of local information contents, and is stable under local and global perturbations in the image domain. For example, image interest points may be corners, text within an image, blobs, etc., and may be located using optical character recognition (OCR), edge detection techniques, analyzing predetermined positions, among other possibilities. In some examples, a template may include the extracted information of the image and a set of descriptors of all interest points in the image.

The query image 108 may be or include one or more images submitted by one or more users. The query image 108 may be of any size, shape, and/or form. Similarly, the query image 108 may be two-dimensional (e.g., a photograph, a figures, a picture) or three-dimensional (e.g. a hologram). The query image 108 may be captured by optical devices (cameras, mirrors, lenses, etc.) or otherwise input by a system or user (e.g., visual sketch drawn or otherwise rendered on an input surface). In one example, the query image 108 may be a frame or multiple frames captured from a moving image or video.

In some examples, the query image 108 may include an image provided in order to perform content-based image retrieval. Content from within the query image 108 may be analyzed and one or more training images matching the content of the query image 108 may be returned. For example, content of the query image 108 may refer to colors, shapes, textures, or other information derived from an image. In some examples, the query image 108 may include an image submitted by a user containing metadata such as keywords, tags, or other descriptions associated with the image.

The visual object recognition module 110 may include or be configured to operate according to one or more programming instructions, for example, computer executable and/or logic implemented instructions to perform functions or steps. Additionally, the visual object recognition module 110 may be circuitry wired to perform one or more programming instructions.

In one example, the visual object recognition module 110 may have access to and interact with a set of training images of the plurality of training image corpora 106. Given a query image 108, the visual object recognition module 110 may retrieve and output training images that are similar to the query image 108. Additionally, for each similar training image, a match score may be provided. For example, the match score may be computed based on a combination of one or more of a number of matched descriptors between the query image 108 and a training image, a computed similarity between raw image data of the query image 108 and a training image, or other potential image comparison algorithms or methods. Moreover, the visual object recognition module 110 may output corresponding metadata of the matched training images.

Figure 2:
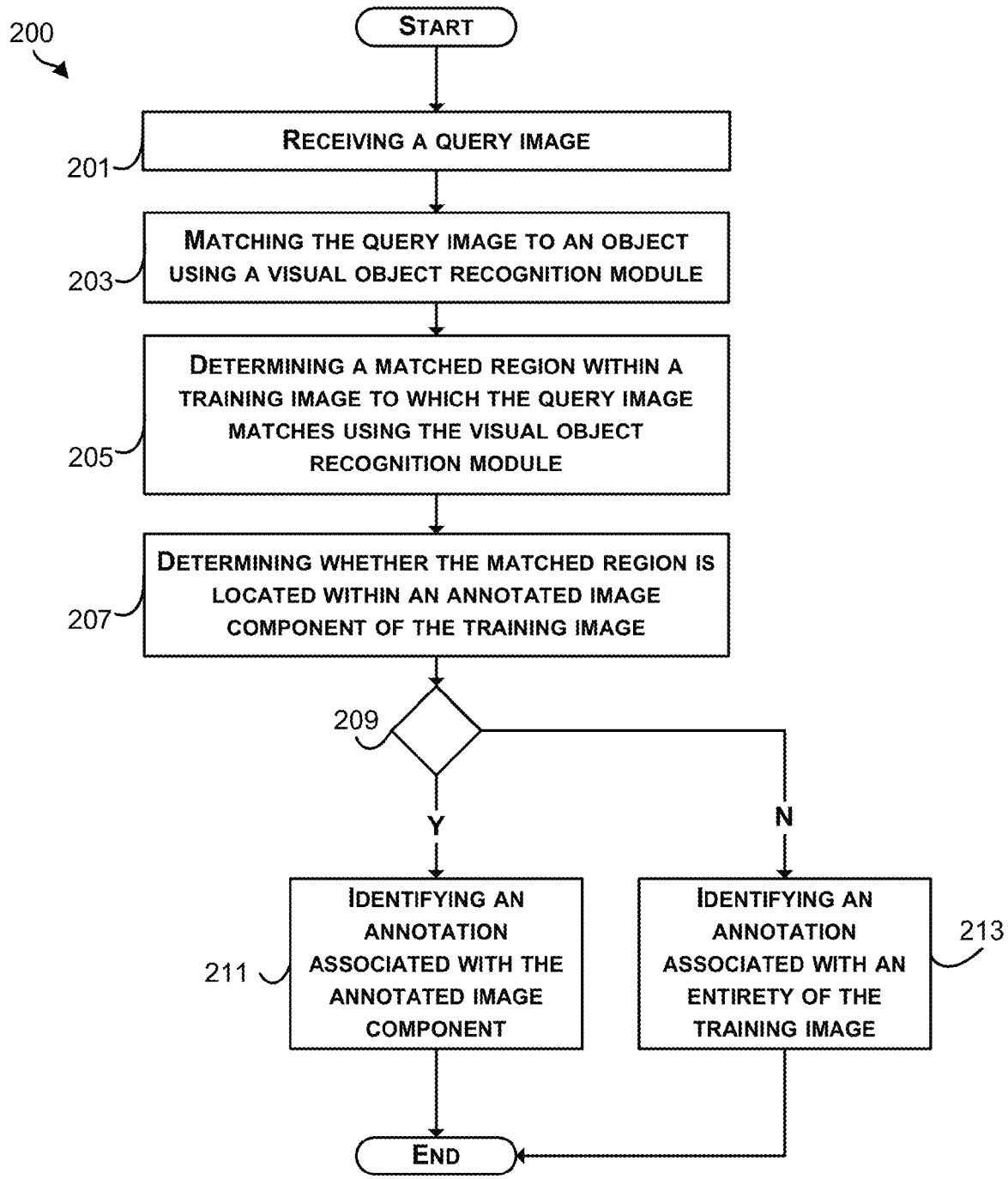
FIG. 2 is an example block diagram of a method to match a query image to an annotated image component, in accordance with at least some embodiments described herein.

FIG. 2 is an example block diagram of a method 200 to match a query image to an annotated image component, in accordance with at least some embodiments described herein. The method 200 shown in FIG. 2 presents an embodiment of a method that may, for example, be used by the system 100 of FIG. 1. Method 200 may include one or more operations, functions, or actions as illustrated by one or more of blocks 201-213. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 201, the method 200 includes receiving a query image. The query image may be an image collected and stored by a system which receives query images from users. In one example, the query image may be a user submitted image for which information is desired. A user may submit a query image in order to determine images matching the query image, or to determine information about the query image, for example. Images matching the query image may include metadata associated with and/or describing the matched images that may be output to the user. Additionally, the query image may be a query comprising multiple images.

The query image may be of one or more image file formats. For example, the query image may be an image file composed of either pixel or vector data that is rasterized to pixels when displayed in a vector graphic display. Example image file formats include JPEG, JPEG 2000, TIFF, RAW, PNG, GIF, BMP, among other possible image file formats. Similarly, the query image may optionally be compressed using a variety of image compression techniques. In some examples, the method 200 includes decompressing the query image for use in conjunction with the method 200 and/or other systems and methods disclosed.

At block 203, the method 200 includes matching the query image to an object using a visual object recognition module. Given a query image, the visual object recognition module may retrieve and output one or more training images matching the query image. The visual object recognition module may utilize information from a plurality of training image corpora. For example, the plurality of training image corpora may include one or more training images associated with a plurality of objects.

In one example, a query image may be an image of an object differing from training images of the object within the training corpus. The query image may, for example, be matched to a training image from the plurality of objects of the training corpus with a variation in illumination of the object. The query image may have been captured under different lighting settings compared with the illumination of the object within the training images of the object. Similarly, in another example, the query image may be an image of an object with a variation in pose or shape of the object as compared to the pose or shape of the object in a given training image.

In another example, the visual object recognition module may match a region or multiple regions of a query image to one or more training images. For example, a query image may be processed to remove background information from the query image or split into multiple regions of separate objects. In one example, a number of similar image descriptors between a training image and the query image may be above a threshold. Accordingly, the training image may be determined to be a match to the query image. Other example methods and techniques used for image matching include template matching, normalized cross-correlation, or multivariate cross-correlation.

In yet another example, match scores may be associated with matches between the query image and one or more training images (or one or more matched regions of the one or more training images) of the plurality of objects. The match score may indicate a level of similarity between a query image and a matching training image (or matched region of a training image), for example. Matches may be prioritized or ranked based on the match scores. In one example, a training image associated with a maximum match score may be selected as a match the query image. In another example, the similarity may be computed based on a number of matched descriptors between a query image and a training image. However, other methods of determining similarity are also contemplated. In one example, an image distance measure may compare the similarity of two images in various dimensions such as color, texture, shape, and others. For example, color histograms of images may be compared, where a color histogram is computed by quantizing the colors within an image and counting the number of pixels of each color. In another example, an intensity-based method may be used to compare patterns in a query image and a training image using correlation metrics.

At block 205, the method 200 includes determining a matched region within a training image to which the query image matches using the visual object recognition module. For example, the visual object recognition module may also output a matched region and/or matched descriptors associated with a query image and one or more matching training images. In one example, the matched region may be determined by forming a boundary (e.g., a rectangle, circle, or free-form shape) around matched descriptors with a level of similarity or quality of match above a threshold. The various methods described above with reference to determining similarity between images (e.g., image distance measure, color methods, intensity-based methods, etc.) may also be applied at the image descriptor level. In another example, the query image may only match a portion of the training image. Similarly, a matched region within a training image may be determined by forming a boundary around matched descriptors. In a further example, multiple matched regions may be determined.

At block 207, the method 200 includes determining whether the matched region is located within an annotated image component of the training image. The annotated image component may be, for example, a sub-region of the training image including an annotation describing the sub-region. Additionally, a training image may include multiple annotated image components, and a determination may be made whether the matched region is located within one or more annotated image components.

In one example, a tolerance may be used for determining whether the matched region is located within an annotated image component. The matched region may be determined to be located within an annotated image component if the matched region lies largely within the annotated image component. For example, the determination may be made based on a percentage of the matched region located within an annotated image component. Similarly, the determination may be made based on a number of matched descriptors of the matched region located within an annotated image component.

At block 209, a decision may be made based on the determination at block 207. If the matched region is determined to be located within an annotated image component of the training image, block 211 of the method 200 may be executed. Alternatively, if the matched region is determined to not be located within an annotated image component, block 213 of the method 200 may be executed. For example, the matched region may match to an entirety of the training image or multiple regions of the training image.

At block 211, the method 200 includes identifying an annotation associated with the annotated image component. Accordingly, the annotation may be returned responsive to the query image being received. The query image may be determined to be a match to the image component, and metadata of the component may be identified and output instead of metadata of the object which the matching training image depicts.

In one example, the annotation associated with the annotated image component may be identified when a percentage of the matched region located within the annotated image component is greater than a percentage threshold. For example, the percentage threshold may be 50%, 75%, 90%, or above 75%. Likewise, the annotation associated with the annotated image component may be identified when a number of descriptors of the matched region within the annotated image component is above a number threshold.

At block 213, the method 200 includes identifying an annotation associated with an entirety of the training image. Accordingly, the annotation may be returned responsive to the query image being received. The query image may be determined to be a match to the training image as a whole, and metadata of the object which the training image depicts may be identified and output.

In one example, the annotation associated with the entirety of the training image may be identified when a percentage of the matched region located within the annotated image component is less than a percentage threshold. Likewise, the annotation associated with entirety of the training image may be identified when a number of descriptors of the matched region within the annotated image component is above a number threshold.

According to an example of the method 200, the query image may be received from a client device. The identified annotation associated with the image component of the training image may be sent to the client device when a determination may be made that, for example, the matched region is located within an annotated image component of the training image.

Figure 3A:
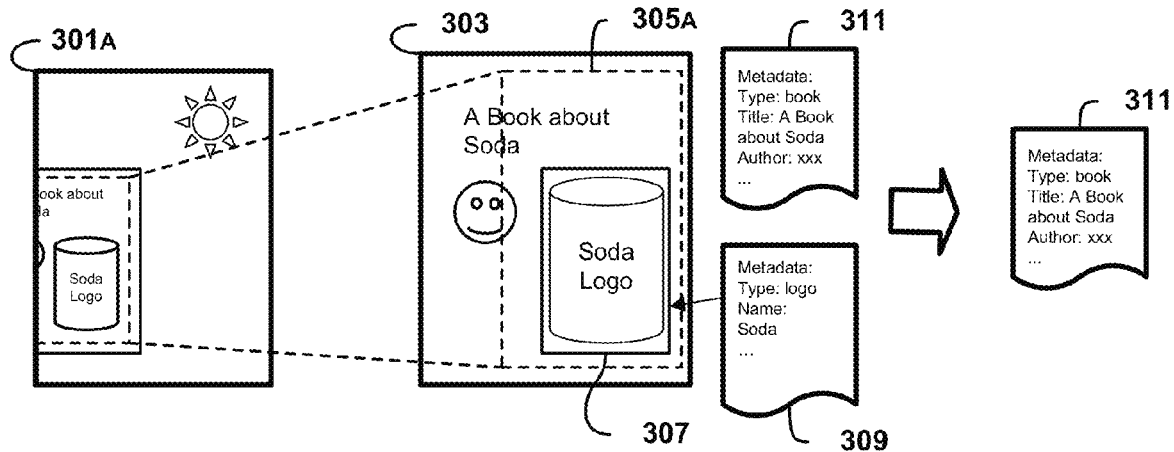
FIG. 3A illustrates an example of a query image and a matched training image.

FIG. 3A illustrates an example of a query image 301a and a matched training image 303. The query image 301a may be matched to the training image 303, for example, by a visual recognition module. The visual recognition module may also determine a matched region 305a within the training image 303 to which the query image 301a (or a region of the query image 301a) matches.

In one example, a determination may be made whether the matched region 305a is located within an annotated image component 307 of the training image 303. The annotated image component 307 may be a sub-region of the training image 303 and may include an associated component annotation 309 describing the sub-region. For example, the annotated image component 307 may be an image of a can of soda on the cover of a book about soda. The component annotation 309 of the annotated image component 307 may be metadata describing a logo on the can of soda.

Although the matched region 305a in FIG. 3A may include the annotated image component 307, the matched region 305a, as illustrated, does not lie within (or substantially within) the annotated image component 307. Accordingly, a system, such as the system 100 of FIG. 1, responsive to receiving the query image 301a, may return an object annotation 311 associated with an object (e.g., a book titled "A book about soda") described by the entirety of the training image 303. In this example, the object annotation 311 may be identified rather than the component annotation 309.

Figure 3B:
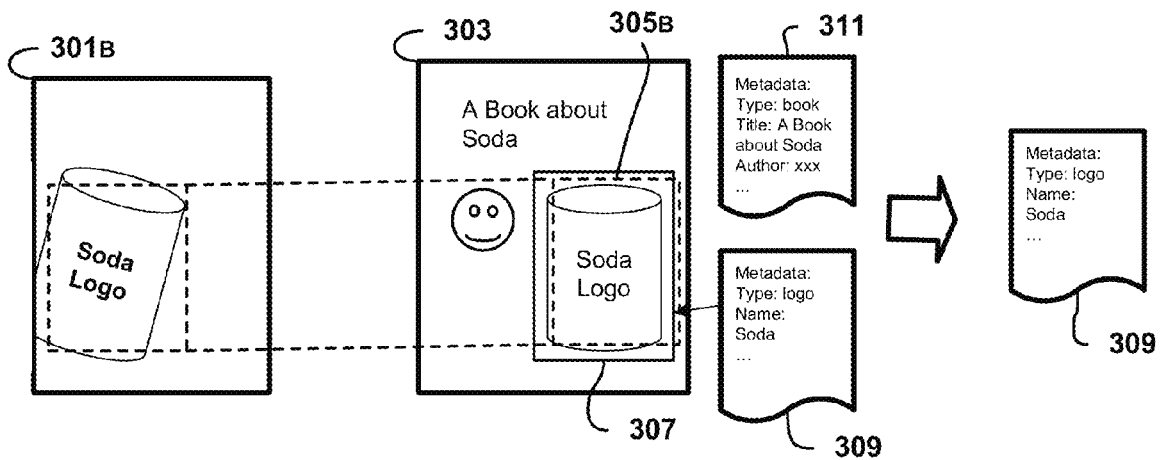
FIG. 3B illustrates another example of a query image and a matched training image.

FIG. 3B illustrates another example of a query image 301b and a matched training image 303. The query image 301b may be matched to the training image 303, for example, by a visual object recognition module. The visual object recognition module may also determine a matched region 305b within the training image 303 to which the query image 301b (or a region of the query image 301b) matches.

In one example, a determination may be made whether the matched region 305b is located within annotated image component 307 of the training image 303. The matched region 305b in FIG. 3B may lie within (or substantially within) the annotated image component 307. Accordingly, a system, such as the system 100 of FIG. 1, responsive to receiving the query image 301*b*, may return the component annotation 309 associated with the annotated object component 307. The component annotation 309 may be returned rather than the object annotation 311. Thus, the query image 301*b* may be matched to an object component (or information associated with the object component, e.g., soda), rather than incorrectly matched to an object (or information associated with the object, e.g., book) with a sub-region depicting the query image 301*b*.

Figure 4:
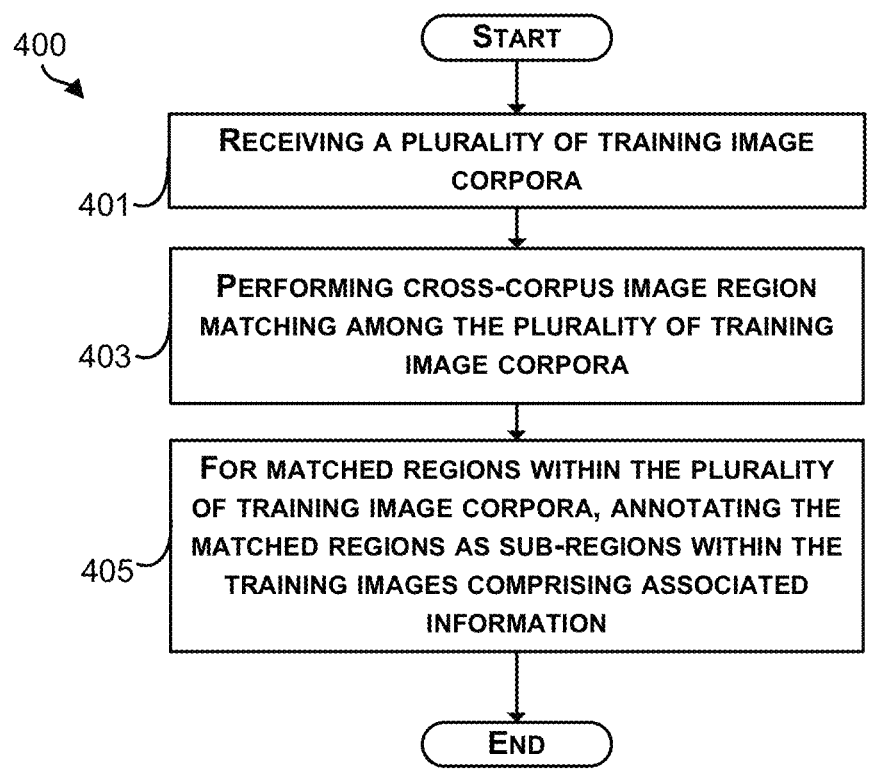
FIG. 4 is an example block diagram of a method to discover and annotate object components, in accordance with at least some embodiments described herein.

FIG. 4 is an example block diagram of a method 400 to discover and annotate object components, in accordance with at least some embodiments described herein. The method 400 shown in FIG. 4 presents an embodiment of a method that may, for example, be used by the system 100 of FIG. 1. Method 400 may include one or more operations, functions, or actions as illustrated by one or more of blocks 401-405. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 4 may represent circuitry that is wired to perform the specific logical functions in the process.

Initially, at block 401, the method 400 includes receiving a plurality of training image corpora. The plurality of training image corpora may describe a set of objects. For each object, there may be one or more training images containing visual appearances of the object, as well as metadata associated with the object (e.g., type, name, etc.). The plurality of training image corpora may be utilized by the visual object recognition module to match images. For example, the visual object recognition module may be trained based on images within the plurality of training image corpora.

At block 403, the method 400 includes performing cross-corpus image region matching among the plurality of training image corpora. Common object components appearing in more than one image of the plurality of training image corpora may be discovered and identified. Common object components may include, for example, logos, famous artwork, letters in a specific font, etc., appearing on different objects represented within the plurality of training image corpora. The plurality of training image corpora may be compared to determine similarities, and object components with a level of similarity above a threshold may be determined to be common object components.

In one example, a matcher or visual object recognition module may be built from all the training images of the plurality of training image corpora. Each training image may be matched using the matcher to identify common sub-structure that appears in more than one training image. For example, matched regions within matching training images of the plurality of training image corpora may be determined based on a similarity between image descriptors of the matching training images. In another example, optical character recognition (OCR) may be used to detect text within training images. Recognized characters associated with training images may be compared and common image components may be determined based on a comparison of recognized characters between training images.

At block 405, the method 400 includes, for matched regions within the plurality of training image corpora, annotating the matched regions as sub-regions within the training images comprising associated information. For example, the matcher may identify a matched region in a first training image matching a second training image. An annotation associated with the second training image may be associated with the matched region of the first training image. Similarly, the matcher may identify a matched region in a first training image matching a sub-region of second training image for which a component annotation is associated. The component annotation of the second training image may be associated with the matched region of the first training image.

Figure 5A:
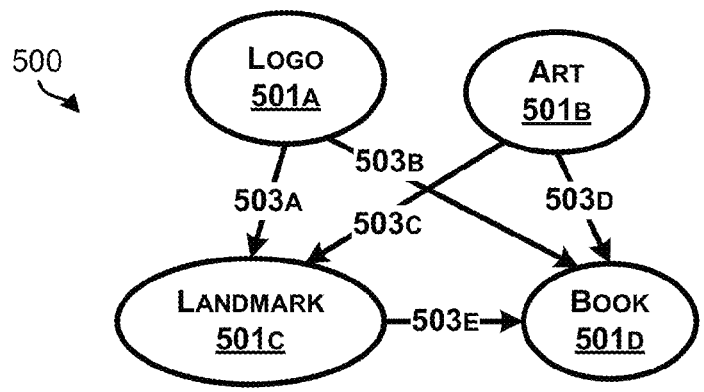
FIG. 5A is an example directed acyclic graph of possible object component relationships.

FIG. 5A is an example directed acyclic graph 500 of possible object component relationships. In FIG. 5A, a collection of vertices and directed edges are illustrated. However, the vertices and directed edges are not meant to be limiting, and are provided as examples modeling a structure. Structures associated with the systems and methods described herein may depart from the example illustrated in FIG. 5A, and may include more or less vertices and/or directed edges than illustrated.

FIG. 5A includes vertices or nodes representing training corpora 501*a-d*. The training corpora 501*a-d* may comprise training images of a logo (501*a*), a piece of artwork (501*b*), a landmark (501*c*), and a book (501*d*) respectively.

Additionally, the training corpora 501*a-d* may be connected by directed edges 503*a-e*. A directed edge 503*a-e* from a first training corpus to a second corpus may represent the presence of an image (or portion of an image) from the first training corpus within an image from the second corpus. For example, directed edge 503*a* may present the presence of an image from training corpus 501*a* (e.g., a logo) within an image from training corpus 501*c* (e.g., a landmark). Similarly, an image of a book cover from training corpus 501*d* may include a logo, a piece of artwork, or a landmark image.

In one example, a visual object recognition module may match training images of first training corpus against training images of a second training corpus for each directed edge 503*a-e*. If a match is found (as in the example of FIG. 5B), the matching region of a training image from the second training corpus may be annotated with the metadata of the training image from the first training corpus.

Figure 5B:
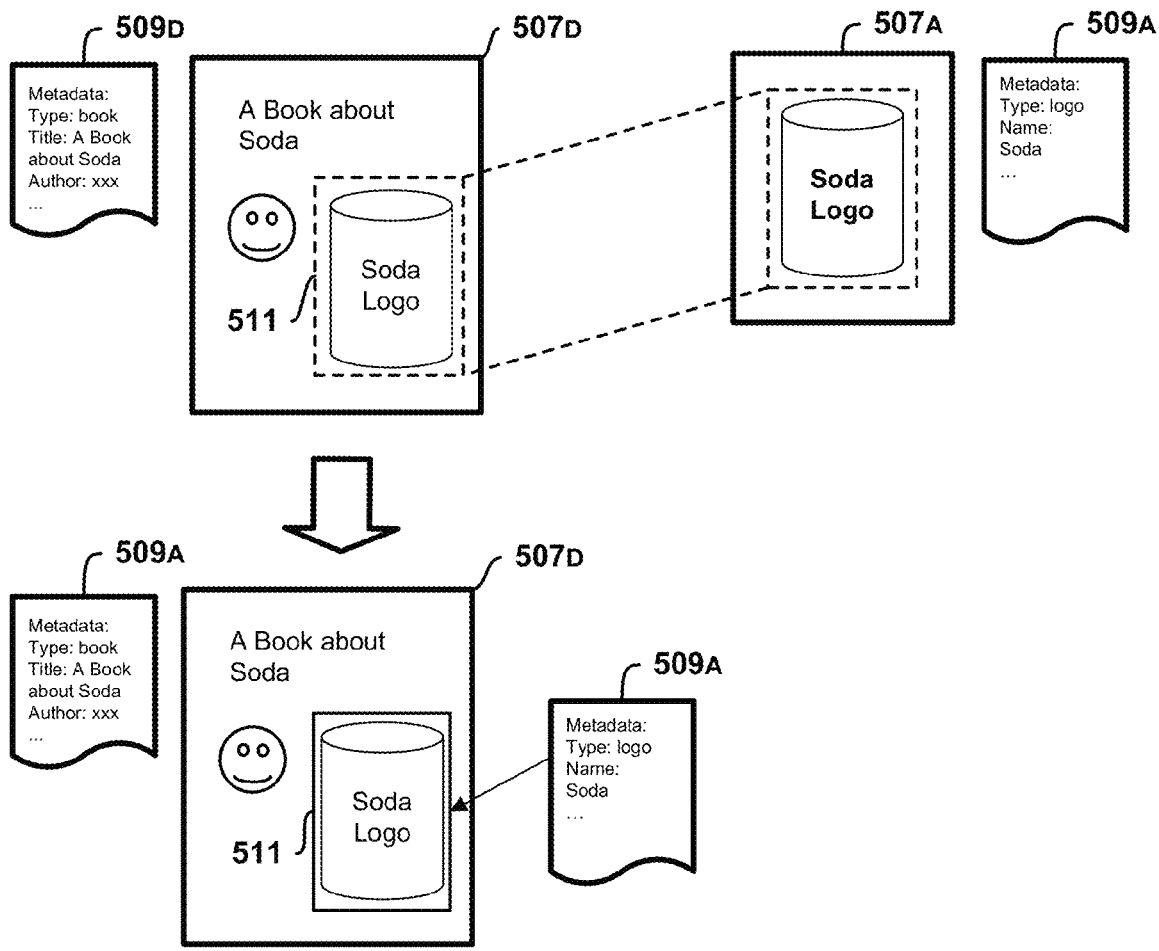
FIG. 5B illustrates an example of annotating an object component.

FIG. 5B illustrates an example of annotating an object component. Cross-corpus image region matching may be performed among the training corpora 501*a-d*. In one example, training images (or sub-regions of training images) from a first training corpus may be matched to training images of a second training corpus. For example, a first training image 507*d* from training corpus 501*d* may match to a second training image 507*a* from training corpus 501*a*. The first training image 507*d* and the second training image 507*a* may each include associated information. The first training image 507*d* may include associated metadata 509*d*, while the second training image 507*a* may include associated metadata 509*a*.

A matched region 511 within the first training image 507*d* may be determined for the match. As an example, the first training image 507*d* may be an image of a book cover and the matched region 511 may be a component of the book cover including an image of a logo. In one example, the matched region 511 may be annotated as a sub-region within the first training image 507*d* comprising associated information. For example, the matched region 511 may be annotated with metadata 509*a*.

In another example, multiple matched regions with the first training image 507*d* may be determined for the match. The multiple matched regions may each be annotated as sub-regions within the first training image 507*d* comprising associated information.

Figure 6:
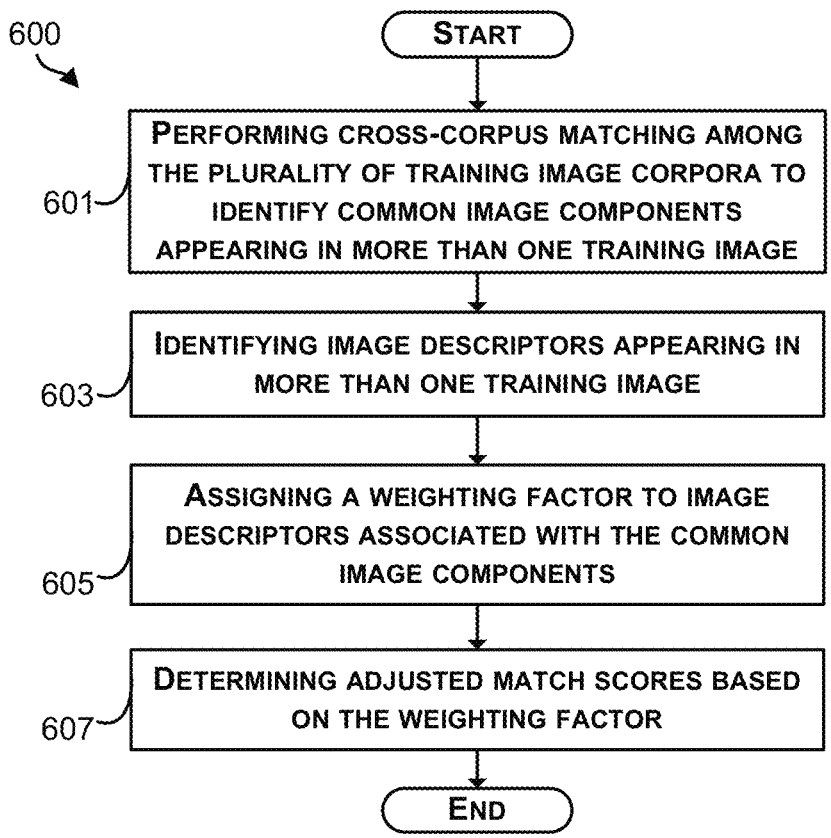
FIG. 6 is an example block diagram of a method to assign a weighting factor to common image components, in accordance with at least some embodiments described herein.

FIG. 6 is an example block diagram of a method 600 to assign a weighting factor to common image components, in accordance with at least some embodiments described herein. The method 600 shown in FIG. 6 presents an embodiment of a method that may, for example, be used by the system 100 of FIG. 1. Method 600 may include one or more operations, functions, or actions as illustrated by one or more of blocks 601-607. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 6 may represent circuitry that is wired to perform the specific logical functions in the process.

Initially, at block 601, the method 600 includes performing cross-corpus matching among the plurality of training image corpora to identify common image components appearing in more than one training image. Common object components appearing in more than one training image of the plurality of training image corpora may be discovered and identified.

Common object components may include, for example, logos, famous artwork, letters in a specific font, etc., appearing on different objects represented within the plurality of training image corpora. Text within training images may be a common image component. Optionally, the text within multiple training images may be in similar fonts. Other sources of common object components appearing in multiple training images include: stock images reused in images of different objects; common patterns such as grids, stars, circles, etc.; and common parts such as a similar frame used in images of two different pieces of artwork.

In one example, a matcher or visual object recognition module may be built from all the training images of the plurality of training image corpora. Each training image may be matched using the matcher to identify common sub-structure that appears in more than one training image.

In another example, optical character recognition (OCR) may be used to detect text within training images. Recognized characters associated with training images may be compared and common image components may be determined based on a comparison of recognized characters between training images.

In a further example, a matcher or visual object recognition module may be built from a database of stock images. The matcher may be used to detect reused image sub-structure in the training images as common image components.

At block 603, the method 600 includes identifying image descriptors appearing in more than one training image. Similar image descriptors within common image components may be determined. For example, an image descriptor within a common image component appearing in more than one training image may be annotated with additional information indicating that the image descriptor may be part of a common image component. In another example, an image descriptor within a common image component may be annotated with additional information indicating the number of training images in which the image descriptor appears.

In a further example, image descriptors may be determined by examining an image, identifying image interest points (e.g., corners, text, edges, etc.) that include distinctive regions in the image, and assigning an identifier to the image interest point. In one instance, an image descriptor includes a numerical representation of pixels that fall within an image interest point (or image sub-region) of the image. In one example, image descriptors include descriptions of visual features of contents in the image, such as characteristics including a shape, a color, or a texture among others. The image descriptors may be compressed, and compressed image descriptors may be compared to identify similar image descriptors.

For example, a technique for compressing image descriptors includes product quantization. Image descriptors may comprise a number of floating point numbers (e.g., referred to as the dimensionality of the descriptor). Product quantization may be performed to divide the dimensions into groups (e.g., such as evenly divided groups) and quantize or represent each group of dimensions using one of K exemplars. An exemplar may be chosen to minimize a sum of squared distances between the descriptor dimension and a nearest neighbor exemplar. Exemplars may be learned from unsupervised clustering algorithms, such as k-means, for example. The k-means clustering algorithm may include a method of cluster analysis that aims to partition n observations into k clusters in which each observation belongs to the cluster with the nearest mean. The k-means clustering algorithm may attempt to find a center of natural clusters in the data.

In one example, in which a descriptor has 100 dimensions (and thus may comprise 100 floating point values) product quantization may include dividing the 100 dimensions into groups, and each group may include four to five dimensions. Thus, the 100 dimensions may be divided into 20 groups with 5 dimensions per group (e.g., group 1 includes dimensions #1-5, group 2 includes dimensions #6-10, and so on). Product quantization represents each group separately using exemplars.

In one example, a list of exemplars may be provided within a codebook. A closest exemplar to the group of dimensions is identified, and selected to represent the group. In the example above, group 1 including dimensions #1-5 (e.g., five floating point values) may be represented by a single exemplar. Thus, instead of representing or storing five floating point values, a single exemplar may be used to represent and store the group of dimensions. Using this method, the descriptor including 100 dimensions, which were divided into 20 groups can be represented by a data representation using 20 exemplars. Thus, the descriptor may be compressed from a data representation of 100 data point to 20 data points. The 20 data points may be compared across image descriptors of two or more potentially matching training images. In one example, if an image descriptor from a first training image matches an image descriptor from a second training image, the image descriptor may be annotated with an additional data point indicating the image descriptor may match to another training image. Similarly, the additional data point may be increased if the image descriptor may be found to be similar to image descriptors of more training images.

At block 605, the method 600 includes assigning a weighting factor to image descriptors associated with the common image components. Instead of treating all descriptors in an image equally, a weighting factor may be assigned to each of the image descriptors within the image. The weighting factor may affect a match score or measure of similarity between one or more image descriptors of training images. In one example, lowering the weighting factor of image descriptors within a common image component may have the effect of lowering match scores which (fully or partially) come from the common image component. Thus, matches may be suppressed in varying degrees depending on the portion of a match that comes from common image components.

In one example, the weighting factor associated with all image descriptors of an image may be 1. Additionally, the weighting factor associated with descriptors determined to be associated with a common image component may be assigned a weighting factor of alpha, where alpha is less than 1. The value of the weighting factor alpha may be a fixed or predetermined value. In other examples, the value of the weighting factor alpha may be a variable, dependent on one or more factors of a system or method.

In one example, the value of the weighting factor alpha may be determined experimentally. A plurality of matching experiments may be performed on a validation set using a series of weighting factor values for alpha. The validation set may be a set of query images including one or more common image components within the plurality of training image corpora, for example. Matching accuracies associated with results of the plurality of matching experiments may be determined. A matching accuracy may be determined for each value of alpha from the series of weight factor values of alpha. The matching accuracy may be determined by analyzing the results received for the set of query images. A value of alpha corresponding to the weighting factor yielding the maximum matching accuracy may be selected and used for image descriptors of common image components.

In another example, weighting factors for image descriptors of a training image within a plurality of training image corpora may be determined using a term frequency-inverse document frequency (TF-IDF) formula. For example, the weighting factors for image descriptors of a training image may be determined using the following formula:

$$(1/x) * \log(D/d),$$

wherein x is a total number of image descriptors in the training image, D is a total number of training images in the plurality of training image corpora, and d is a total number of training images in which the image descriptor appears.

At block 607, the method 600 includes determining adjusted match scores based on the weighting factor. Multiple approaches exist on how the weight of descriptors may be applied to obtain an adjust match score. One possible example includes determining an adjust match score given an original match score based on the following formula:

$$S' = S * \frac{dw_{matched}}{dw_{image}},$$

where S' is an adjusted match score, S is a match score computed without assigning weighting factors to image descriptors, $dw_{matched}$ is a sum of weighting factors of matched image descriptors within a training image, and $dw_{image}$ is a sum of weighting factors of image descriptors within the training image. Thus, the match score may be adjusted according to descriptor weights within a training image. A match consisting of mainly low-weight descriptors, for example, may have a lower adjusted match score than original match score computed without assigning weighting factors.

Figure 7A:
FIG. 7A illustrates an example of common image components.

FIG. 7A illustrates an example of common image components 701a, 701b. In the example, similar fonts may be used for the headings of two newspapers and may cause incorrect or irrelevant matches between images of the objects. The common image components 701a, 701b may appear within training images 703a, 703b respectively of the two newspapers. The common image components 701a, 701b, as illustrated may be characters of a common word (e.g., the characters "mes" of the word "Times") appearing within training images 703a, 703b.

Figure 7B:
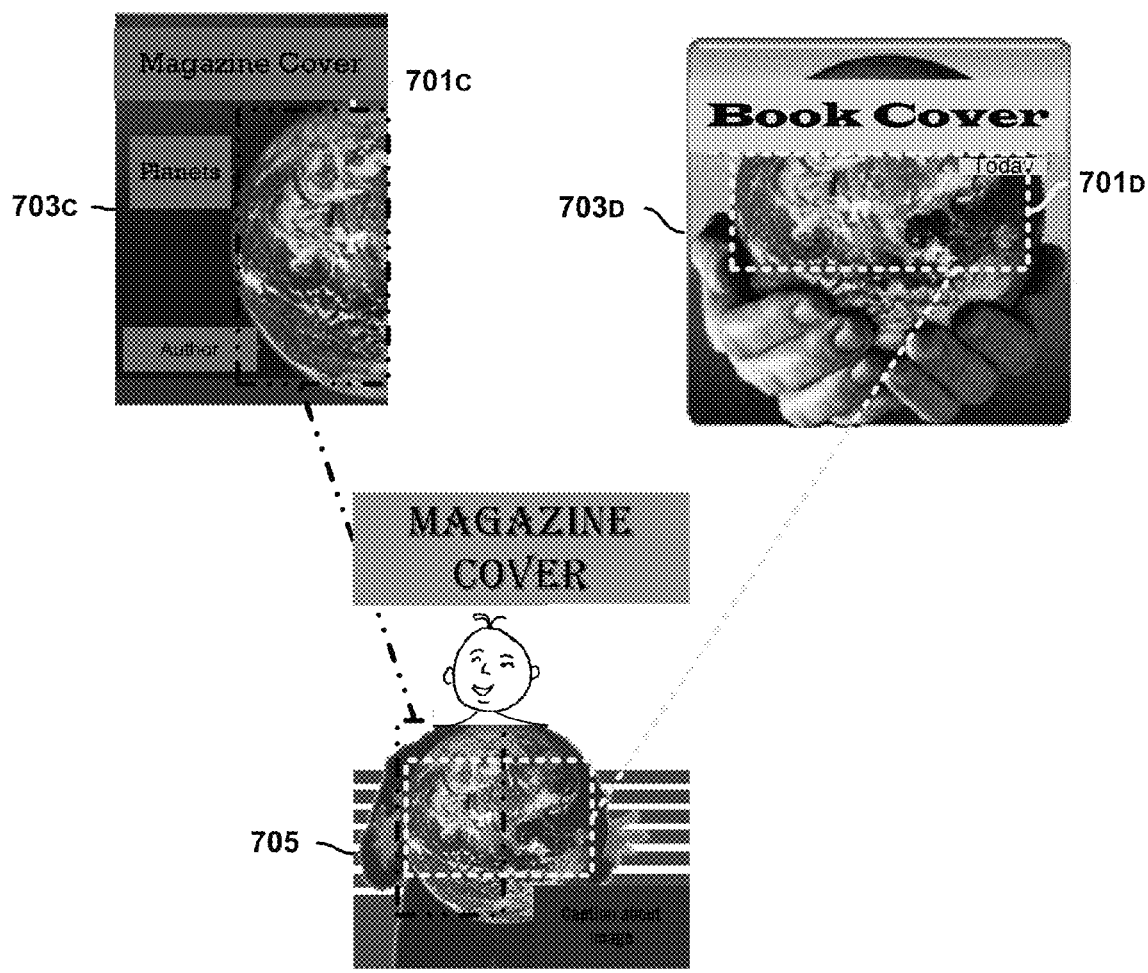
FIG. 7B illustrates another example of common image components.

FIG. 7B illustrates another example of common image components 701c, 701d. A query image 705 may be matched to two similar training images 703c, 703d using a matcher or visual object recognition module. Matched regions within the training images 703c, 703d may be identified. However, the matched regions may be identified as common image components 701c, 701d which may not be specific to the query image 705. In one example, the similar training images 703c, 703d may be determined not to be matches to the query image 705. In another example, the ranking of a match score between the query image 705 and the similar training images 703c, 703d may be decreased or down-weighted based on the identification of common image components 701c, 701d.

Figure 8:
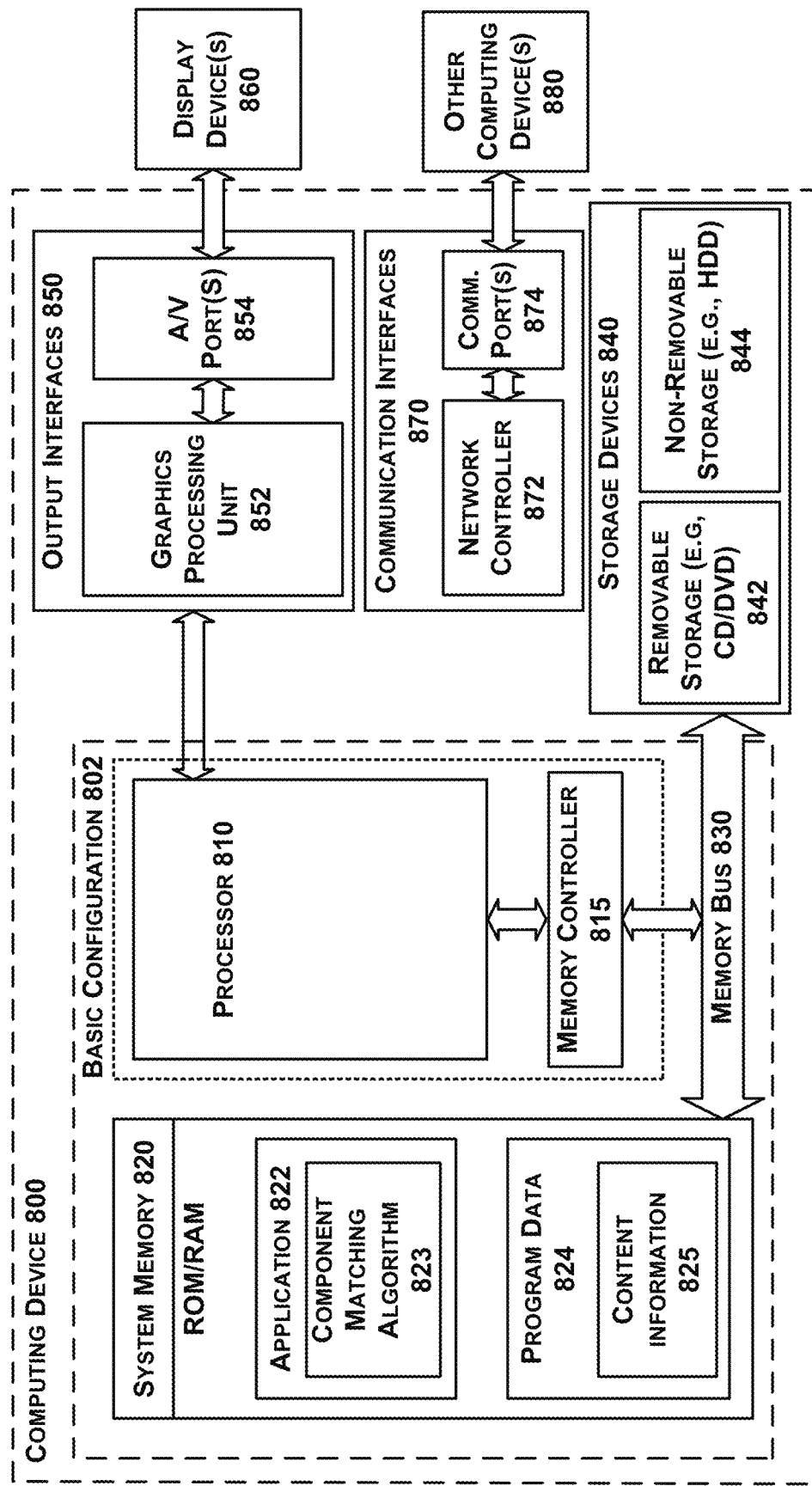
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device may be a personal computer, mobile device, cellular phone, touch-sensitive wristwatch, tablet computer, video game system, or global positioning system, and may be implemented to improve visual object recognition as described in FIGS. 1-7. In a basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor (μP), a microcontroller (μC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include a component matching algorithm 823 that is arranged to provide inputs to the electronic circuits, in accordance with the present disclosure. Program data 824 may include content information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more A/V ports or a communication interface 880. The communication interface 870 may include a network controller 872, which can be arranged to facilitate communications with one or more other computing devices 780 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein. In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. Thus, for example, referring to the embodiments shown in FIG. 2, FIG. 4, and FIG. 6 one or more features of blocks 201-213, blocks 401-405, and blocks 601-607 may be undertaken by one or more instructions associated with the signal bearing medium 901.

In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 902.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving a query image;
matching the query image to an object using a visual object recognition module, wherein the visual object recognition module is configured to utilize information from a plurality of training image corpora to match the query image to a training image of the object;
determining a matched region within the training image to which the query image matches using the visual object recognition module; and
responsive to determining the matched region:
determining whether the matched region is located within an annotated image component of the training image, wherein the annotated image component is a sub-region of the training image and has an associated annotation describing the sub-region, and
when the matched region is located within the annotated image component of the training image, identifying an annotation associated with the annotated image component.

2. The method of claim 1, further comprising identifying the annotation associated with the annotated image component when a percentage of the matched region located within the annotated image component is greater than a percentage threshold.

3. The method of claim 1, further comprising identifying an annotation associated with an entirety of the training image when a percentage of the matched region located within the annotated image component is less than a percentage threshold.

4. The method of claim 1, further comprising:
receiving the query image from a client device; and
sending the identified annotation associated with the annotated image component to the client device.

5. The method of claim 1, further comprising:
receiving the plurality of training image corpora, wherein the plurality of training image corpora comprise a plurality of training images of a plurality of objects, wherein one or more training images comprise metadata related to the plurality of objects;
performing cross-corpus image region matching among the plurality of training image corpora; and
for matched regions within the plurality of training image corpora, annotating the matched regions as sub-regions within the training images comprising associated information.

6. The method of claim 1, further comprising
matching the query image to one or more training images of the plurality of objects;
determining matched regions within the one or more training images to which the query image matches;
determining match scores indicating a level of similarity between the query image and the matched regions; and
selecting the training image associated with a maximum match score as a match to the query image.

7. The method of claim 6, further comprising:
performing cross-corpus matching among the plurality of training image corpora to identify common image components appearing in more than one training image;
identifying image descriptors appearing in more than one training image, wherein image descriptors comprise information associated with image interest points within a training image;
assigning a weighting factor to image descriptors associated with the common image components, wherein the weighting factor influences the match scores between the query image and the matched regions; and
determining adjusted match scores based on the weighting factor.

8. The method of claim 7, wherein the common image components comprise one or more of the following identified within multiple training images:
similar text, similar fonts, similar patterns, and stock images.

9. The method of claim 7, further comprising:
performing a plurality of matching experiments on a validation set using a series of weighting factors, wherein the validation set is a set of query images comprising one or more of the common image components;
determining matching accuracies associated with results of the plurality of matching experiments performed using the series of weighting factors; and
selecting the weighting factor yielding a maximum matching accuracy.

10. The method of claim 6, further comprising:
assigning a weighting factor to image descriptors of the training images, wherein image descriptors comprise information associated with image interest points within a training image; and
determining adjusted match scores from the visual object recognition module based on the weighting factor.

11. The method of claim 10, wherein the weighting factors are computed using the following formula:

$$(1/x)*\log(D/d),$$

wherein x is a total number of image descriptors in the training image, D is a total number of training images in the plurality of training image corpora, and d is a total number of training images in which the image descriptor appears.

12. The method of claim 10, further comprising the visual object recognition module computing the adjusted match scores using the following formula:

$$S' = S * \frac{dw_{matched}}{dw_{image}},$$

wherein S' is an adjusted match score, S is a match score computed without assigning weighting factors to image descriptors, $dw_{matched}$ is a sum of weighting factors of matched image descriptors within a training image, and $dw_{image}$ is a sum of weighting factors of image descriptors within the training image.

13. The method of claim 7, wherein performing cross-corpus matching further comprises:
using optical character recognition (OCR) to recognize characters in the plurality of training image corpora; and
comparing the recognized characters to identify common image components appearing in more than one training image.

14. A non-transitory computer readable medium having stored therein instructions executable by a computing device to cause the computing device to perform functions of:
receiving a query image;
matching the query image to an object using a visual object recognition module, wherein the visual object recognition module is configured to utilize information from a plurality of training image corpora to match the query image to a training image of the object;
determining a matched region within the training image to which the query image matches using the visual object recognition module; and
responsive to determining the matched region:
determining whether the matched region is located within an annotated image component of the training image, wherein the annotated image component is a sub-region of the training image and has an associated annotation describing the sub-region, and
when the matched region is located within the annotated image component of the training image, identifying an annotation associated with the annotated image component.

15. The computer readable medium of claim 14, further comprising instructions to perform functions of:
receiving a plurality of training image corpora, wherein the plurality of training image corpora comprise a plurality of training images of a plurality of objects, wherein one or more training images comprise metadata related to the plurality of objects;
performing cross-corpus image region matching among the plurality of training image corpora; and
for matched regions within the plurality of training image corpora, annotating the matched regions as sub-regions within the training images comprising associated information.

16. The computer readable medium of claim 14, further comprising instructions to perform functions of:
matching the query image to one or more training images of the plurality of objects;
determining matched regions within the one or more training images to which the query image matches;

performing cross-corpus matching among the plurality of training image corpora to identify common image components appearing in more than one training image;

identifying image descriptors appearing in more than one training image, wherein image descriptors comprise information associated with image interest points within a training image;

assigning a weighting factor to image descriptors associated with the common image components, wherein the weighting factor influences match scores between the query image and the matched regions;

determining match scores based on the weighting factor; and selecting the training image associated with a maximum match score as a match to the query image.

17. A system comprising:

a memory;

a processor coupled to the memory; and instructions stored in the memory and executable by the processor to perform functions of:

receiving a query image;

matching the query image to an object using a visual object recognition module, wherein the visual object recognition module is configured to utilize information from the plurality of training image corpora to match the query image to a training image of the object;

determining a matched region within the training image to which the query image matches using the visual object recognition module; and responsive to determining the matched region:

determining whether the matched region is located within an annotated image component of the training image, wherein the annotated image component is a sub-region of the training image and has an associated annotation describing the sub-region, and when the matched region is located within the annotated image component of the training image, identifying an annotation associated with the annotated image component.

18. The system of claim 17, further comprising instructions for:

receiving the plurality of training image corpora, wherein the plurality of training image corpora comprise a plurality of training images of a plurality of objects, wherein one or more training images comprise metadata related to the plurality of objects;

performing cross-corpus image region matching among the plurality of training image corpora; and for matched regions within the plurality of training image corpora, annotating the matched regions as sub-regions within the training images comprising associated information.

19. The system of claim 17, further comprising instructions for:

matching the query image to one or more training images of the plurality of objects;

determining matched regions within the one or more training images to which the query image matches;

performing cross-corpus matching among the plurality of training image corpora to identify common image components appearing in more than one training image;

identifying image descriptors appearing in more than one training image, wherein image descriptors comprise information associated with image interest points within a training image;

assigning a weighting factor to image descriptors associated with the common image components, wherein the weighting factor influences match scores between the query image and the matched regions;

determining match scores based on the weighting factor; and selecting the training image associated with a maximum match score as a match to the query image.

20. The system of claim 17, wherein the query image only matches a portion of the training image.

* * * * *